US010142828B1

(12) United States Patent
Williams

(10) Patent No.: US 10,142,828 B1
(45) Date of Patent: Nov. 27, 2018

(54) PRESSURE SENSITIVE INPUT DEVICE AND INTEGRATED MOBILE MEDIA DEVICE ASSEMBLY

(75) Inventor: Daniel J. Williams, Plano, TX (US)

(73) Assignee: Open Invention Network LLC, Durham, NC (US)

(*) Notice: Subject to any disclaimer, the term of this patent is extended or adjusted under 35 U.S.C. 154(b) by 177 days.

(21) Appl. No.: 13/167,848

(22) Filed: Jun. 24, 2011

Related U.S. Application Data

(60) Provisional application No. 61/358,035, filed on Jun. 24, 2010.

(51) Int. Cl.
*H04W 88/06* (2009.01)
*H04W 8/18* (2009.01)
*H04W 4/02* (2018.01)
*H04W 4/029* (2018.01)
*H04W 4/024* (2018.01)

(52) U.S. Cl.
CPC .............. *H04W 8/18* (2013.01); *H04W 4/02* (2013.01); *H04W 4/024* (2018.02); *H04W 4/029* (2018.02)

(58) Field of Classification Search
CPC ........... H04N 21/4122; H04N 21/4126; H04N 21/4621; H04M 1/72519; H04M 1/72522; H04M 1/72527; H04M 1/7253; H04M 1/72525; H04W 88/06; H04W 76/02; H04W 4/18; H04W 8/18; H04W 4/003; H04W 88/04

USPC ................... 455/405, 406, 414.1, 456.1, 566
See application file for complete search history.

(56) References Cited

U.S. PATENT DOCUMENTS

| | | | |
|---|---|---|---|
| 2004/0109436 A1* | 6/2004 | Vargas et al. ................. | 370/350 |
| 2005/0204025 A1* | 9/2005 | Haparnas ....................... | 709/223 |
| 2006/0203758 A1* | 9/2006 | Tee ........................ | H04W 88/04 370/315 |
| 2007/0243907 A1* | 10/2007 | Jin et al. ......................... | 455/566 |
| 2008/0045265 A1* | 2/2008 | Yach et al. .................. | 455/556.1 |
| 2008/0070561 A1* | 3/2008 | Keum et al. .................. | 455/419 |
| 2009/0036125 A1* | 2/2009 | Coppinger et al. ........ | 455/435.1 |
| 2010/0037057 A1* | 2/2010 | Shim et al. .................... | 713/171 |
| 2011/0164175 A1* | 7/2011 | Chung ............... | H04N 21/4126 348/468 |

* cited by examiner

Primary Examiner — Liton Miah

(57) ABSTRACT

Disclosed are an apparatus and method of communicating between a mobile device and a host computing device. One example method of operation may include sensing a wireless communication signal at the host computing device, establishing a wireless connection between the mobile device and the host computing device via the wireless communication signal, and migrating at least one application from the mobile device to the host computing device. The ongoing communication between the mobile device and the host computing device enables applications to be executed on one device and accessed via the other device, providing a user with the capability to operate more than one device at a time.

20 Claims, 11 Drawing Sheets

PRESSURE SENSITIVE INPUT DEVICE AND INTEGRATED MOBILE MEDIA DEVICE ASSEMBLY

CROSS REFERENCE TO RELATED APPLICATIONS

This application claims benefit to provisional application No. 61/358,035, entitled "Input Device Including a Pressure Sensitive Tactile Sensor Assembly for Improving the User Functionality and Efficiency in Portable Media Devices, Remote Control Applications and Other Embedded Applications", filed on Jun. 24, 2010, the entire contents of which are hereby incorporated by reference.

TECHNICAL FIELD OF THE INVENTION

This invention relates to a method and apparatus of providing a pressure sensitive input device, and more particularly, a pressure sensitive tactile sensor assembly providing user functionality and efficiency in portable media devices and related applications.

BACKGROUND OF THE INVENTION

With the advancement of computing or data manipulation devices, such as personal computers (PCs), Apple® computers (MACs), media hardware, both portable and stationary, I/O sensors, remote devices, appliances, data and communications capabilities have been driven to increased mobility. With these changes has come a plethora of new mobile devices employing touch screen user interfaces. In this changing time there is a need to reduce the total number of electronic devices in our lives and improve the functionality, and efficiency while reducing the complexity of the corresponding user interface(s).

FIG. 1 illustrates a conventional computing device and corresponding user interface. A user may interface with the computing device 102 via peripheral devices, such as a keyboard 106 and a mouse 120. The user manipulations performed by the mouse 120 may be viewable on a monitor 104, which illustrates a cursor moving across the viewable area of the monitor 104. Wireless interfaces used to connect the keyboard 106 and the mouse 120. In this example, there are no smart devices or computing devices used as peripherals to the desktop computing device 102.

The mere number of personal computing devices and the various types of user input interfaces employed in such mobile devices (e.g., phone, audio player, video player, social networking, web browser, document editor, etc.) may be overwhelming. For instance, the stationary computing devices at work and home and the mobile devices used in-between may leave the user tired of switching back-and-forth between devices during the course of the day. Certainly, it is advantageous to have a single device or an integrated device that implements the same intuitive interface and appearance to the end user. Such a device would provide a user input interface for all electronic computing devices used in the user's daily life.

SUMMARY OF THE INVENTION

One embodiment of the present invention may include a method of communicating between a mobile device and a host computing device. The method may include sensing a wireless communication signal at the host computing device, establishing a wireless connection between the mobile device and the host computing device via the wireless communication signal, and migrating at least one application from the mobile device to the host computing device.

Another example embodiment of the present invention may include a mobile apparatus configured to communicate with a host computing device. The mobile apparatus may include a sensor configured to sense a wireless communication signal from the host computing device and a transmitter configured to establish a wireless connection with the host computing device in response to the wireless communication signal. The mobile apparatus may also include a processor configured to migrate at least one application to the host computing device.

DETAILED DESCRIPTION OF THE INVENTION

Figure 1:
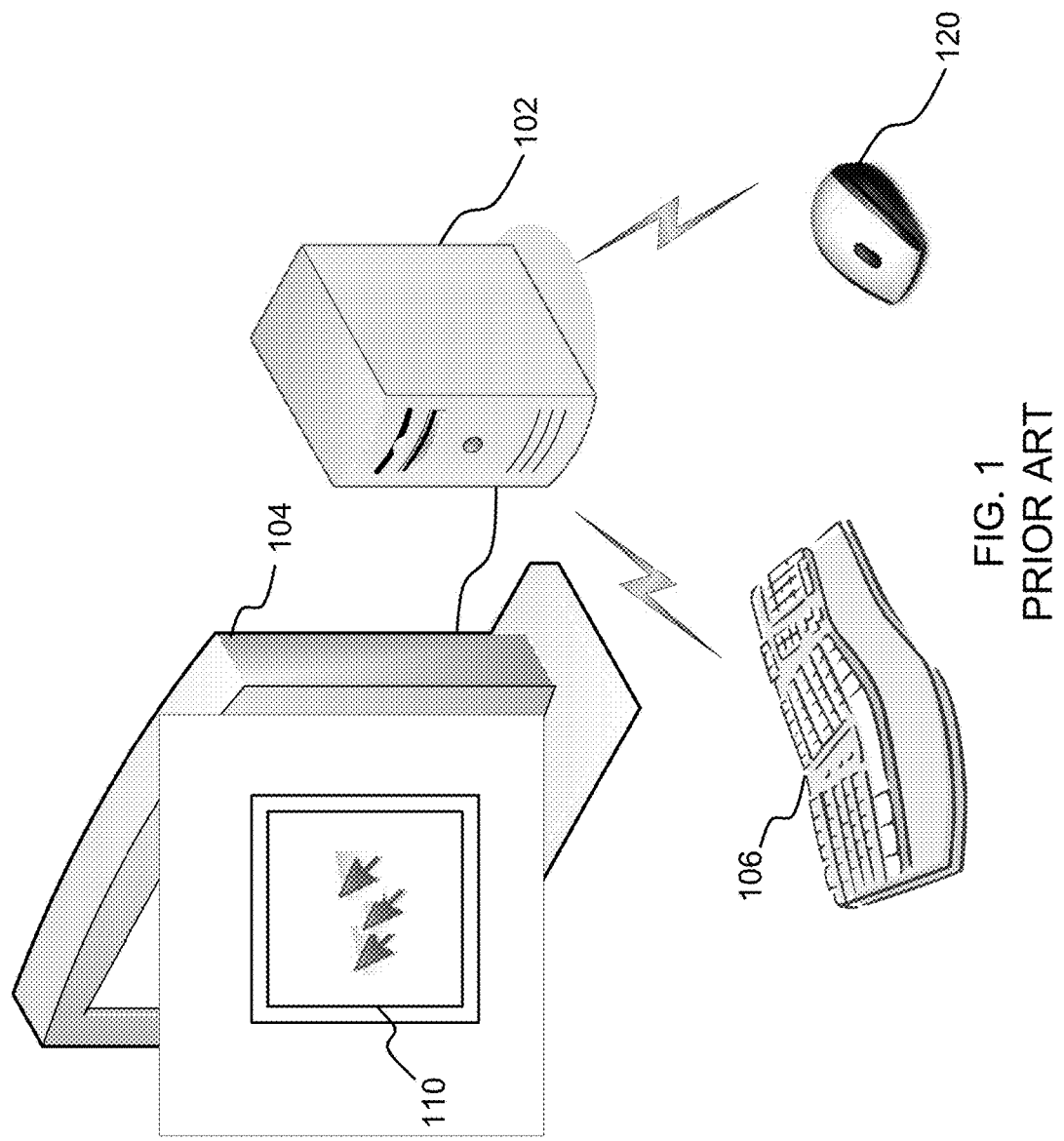
FIG. 1 illustrates a conventional computer system, according to example embodiments of the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Example embodiments of the present invention provide a method, apparatus, software program and other related implementations for the execution of a user interface. The natural and efficient movement of the finger, thumb or contact device may be defined by a function based on the initial contact position, and further including changes to the function based on an integrated response of a directional vector of the contact device and the pressure exerted on the touch sensor. In addition, as long as contact is maintained, the function will continue to be executed at a rate determined by an integrated response value. This procedure, in turn, simplifies the movement and actions required to execute functionality through such a touch movement user interface. Other examples of the present invention may provide a single mobile device, which is enabled as a unified user input to all electronic devices.

User interface controls may be provided in various different configurations. For example, the use of touch sensitive matrices, touch screen devices, and the incorporation of a pressure sensitive layer may provide a touch sensitive user input device. The touch screen device is configured to follow natural patterns of motion, while integrating input from the directional vector of a contact object brought into contact with the screen. The pressure applied by the touching object (e.g., finger, stylus, etc.) may be interpreted by the directional vector and touch function to enhance the user's overall experience.

The touch screen may be used to receive input at a data processing device, such as a portable media device via direct and local operation, or through wireless communication, such as Bluetooth, WIFI or cellular communication (3G, 4G, etc.). A data processing communication device may include a cellular phone, smart phone, personal digital assistant (PDA), tablet device (IPAD®) or WIFI enabled device, such as an iTouch®. The input device itself may be functional across all mobile and computing device operating systems. Through the device programming capabilities the input device can execute all standard input functions for navigation, activation, program operation, but may also enable compound commands, such as those defined in input device gestures for either Windows®, Apple® or Linux® in the full versions or via a comparable portable version.

Figure 2:
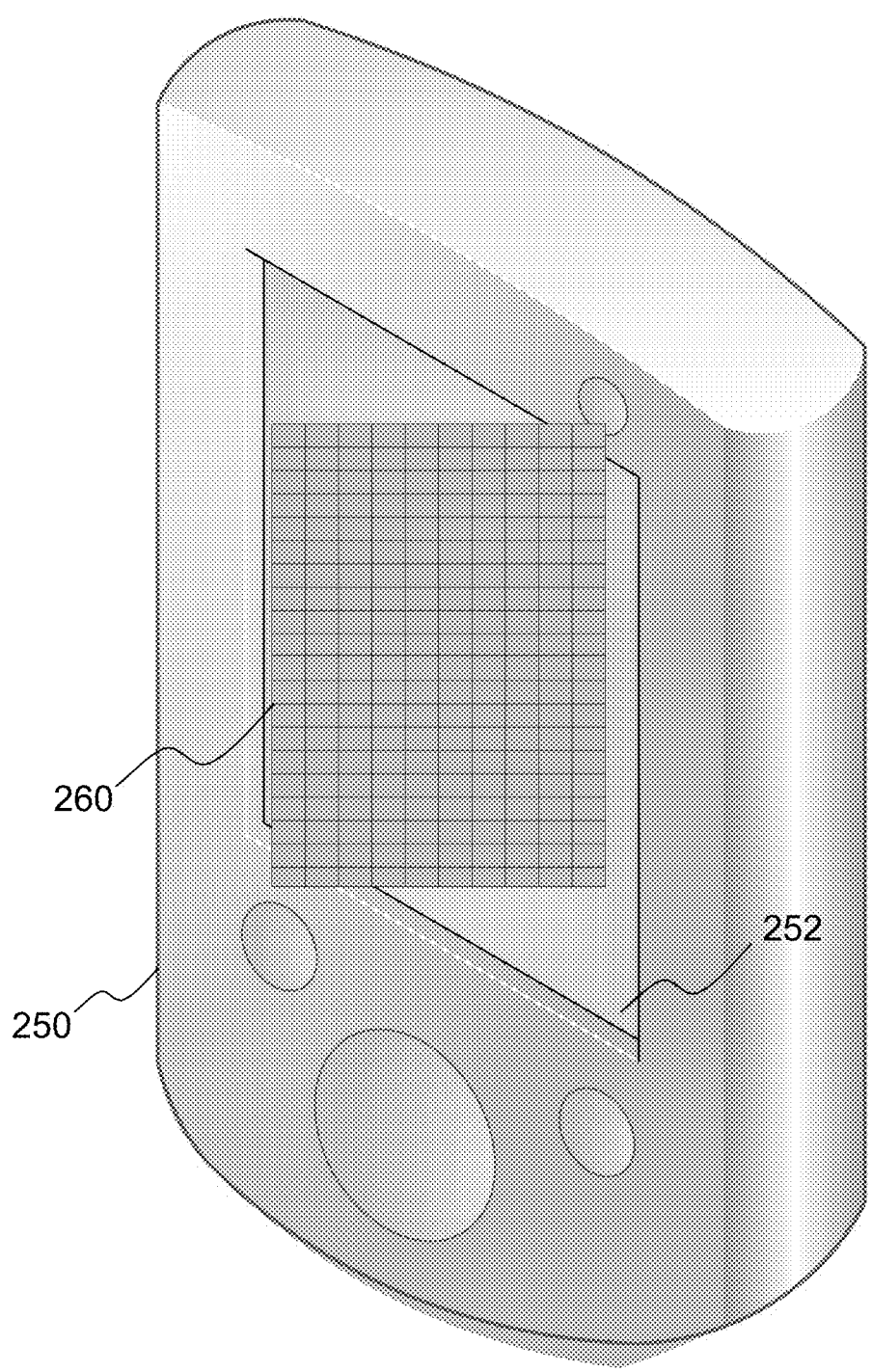
FIG. 2 illustrates an example handheld touch screen device with an integrated touch screen sensitive array, according to example embodiments of the present invention.

An example of a touch screen array being integrated into a touch screen device is illustrated in FIG. 2. Referring to FIG. 2, an example touch screen array is integrated into a touch screen device of a mobile station 250. The mobile station 250 may be a smart phone, handheld computer, cell phone, PDA or other portable computing device. The display 252 may include a monitor with a protective layer and an embedded sensor array 260, which enables user input (touch) to be received and interpreted into an output response, such as a user initiated display menu option.

Advanced functions may be performed by the enclosed pressure sensitive touch screen example devices. Generally, numerous functions are available in a small space and provide enhanced operational control over touch functions. The underlying integration of the functional direction vector and the pressure applied may be used to control the example touch functions. Specific functions from any operating system may be used to control output functionality, and may be mapped to a specific motion/pressure action or area as described in detail below. At initial setup of the user interface (UI) data processing device, the user or any new user will be queried to execute defined motions and pressure tests that will define their specific touch and pressure attributes as sensed by the pressure sensitive touch screen shown.

Figure 5:
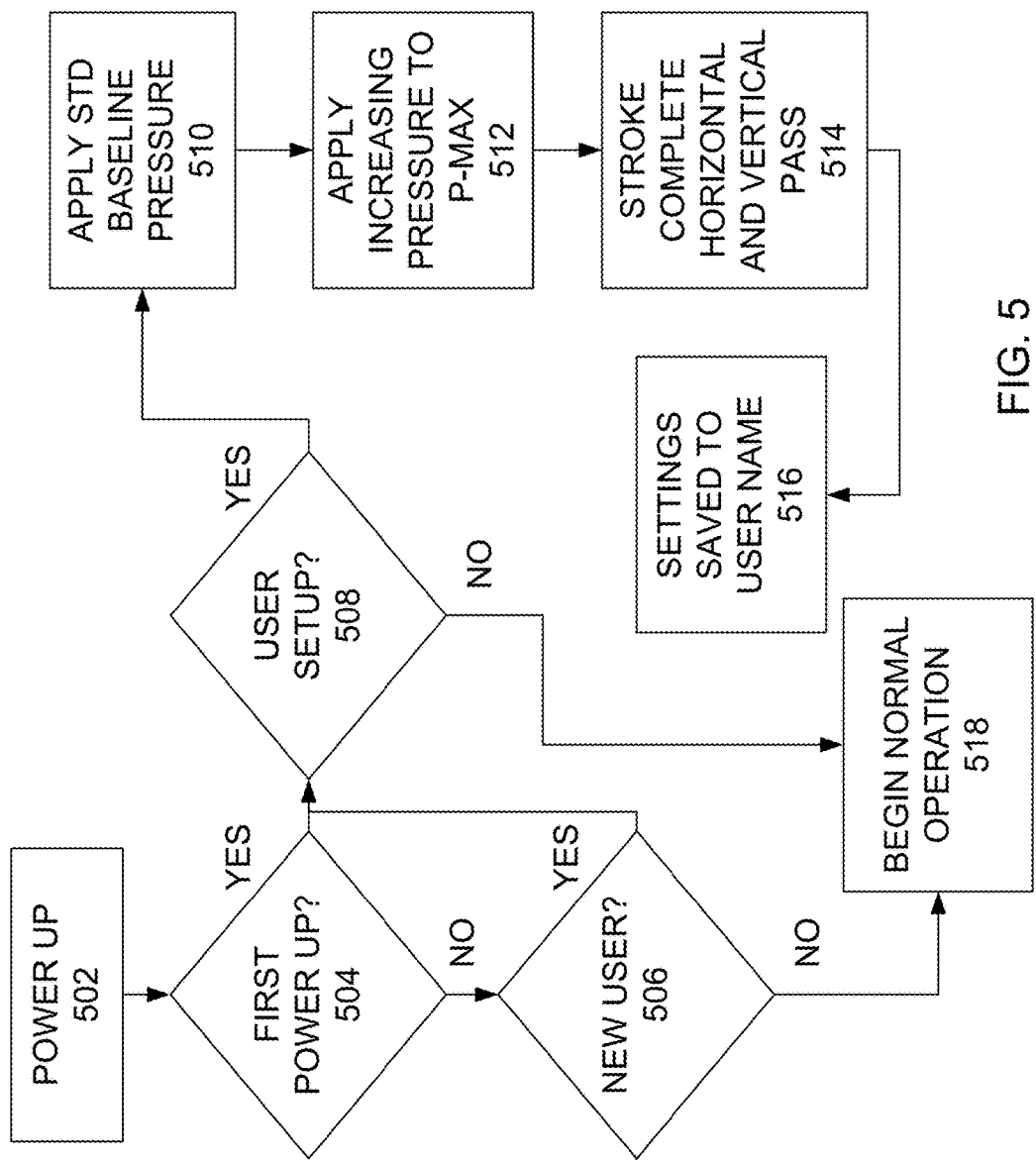
FIG. 5 illustrates an example logic diagram of an example method of calibration, according to example embodiments of the present invention.

FIG. 5 illustrates a logic diagram that illustrates an example calibration procedure according to example embodiments of the present invention. Referring to FIG. 5, the baselines for the pressure sensitivity of the touch pad device may be obtained and then stored in memory in a local lookup library index. In the event that the user would prefer a quick start then there is a standard (default) defined set of parameters and nominal pressure definitions assigned in a default look-up library. The defaults may also be changed through a device settings software feature at any time during the use of the given device. Since the data processing devices may be used by more than one individual, then multiple local lookup libraries can be defined, stored, indexed and associated with a particular user sign-in operation. In the event that the user does not have a local lookup library then they will be queried to create a new library or use the default local lookup library.

The local lookup library is similar in function to the definition of "HotKeys" or predefined shortcut keys. For example, user input device gestures may be defined to enable compound functions based on user definitions in a Linux based OS, Linux based applications, or Windows 7® Aero functions, such as Shake and Split. A particular pressure sensitive touch screen device may be programmed in association with these particular operational functions.

The user may also need to define a series of associations to define which devices are attached to the input touch device for functionality, such as a user input device via WIFI using MAC addresses or Bluetooth using association definition. Once the associations are established, when the input devices are in proximity to the host device the mobile pressure sensitive touch screen device will query the user as to their desire to connect to the host device at this time. This enables the pressure sensitive touch screen of the user's mobile device to operate as the user input device for other computing devices using the familiar touch and feel to operate multiple computing devices as well as local operation when in unlinked mode.

Figure 3:
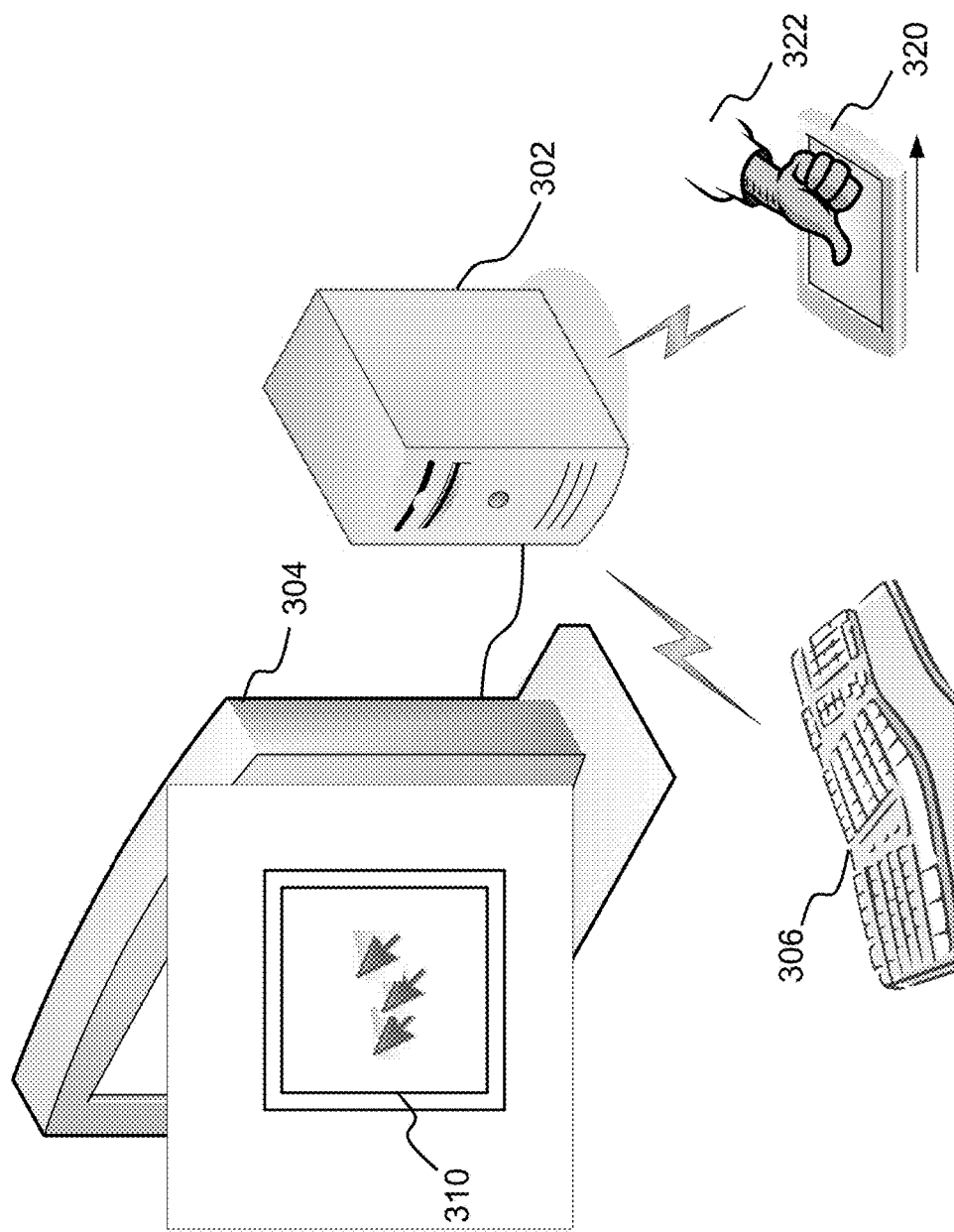
FIG. 3 illustrates an example touch screen system incorporating a touch screen device and a computing device, according to example embodiments of the present invention.

FIG. 3 illustrates an example touch screen device and host device integration system, according to example embodiments of the present invention. Referring to FIG. 3, a host device 302 with a corresponding display device 304 and keyboard 306 is illustrated. The host device 302 may be a personal computer or laptop device configured with wireless connectivity to peripherals, such as the keyboard 306 or other wireless enabled devices, such as a smart phone, PDA, table computing device, etc. In this example, the user has established a communication connection with the host device 302 via a tablet computing device 320, which is operated by user touch movements initiated by the user's hand 322 moving across the surface of the device. The movement of the user's finger 322 or contact object across the pressure sensitive touch screen device 320 will create movement as illustrated by the arrow cursor trails shown on the display area 310 of the display device 304.

Examples of common methods of device communication are provided by Bluetooth for distances up to approximately 33 feet from the receiver of the UI signal. Another communication device example may be for radio frequency (RF) signaling for distances up to about ten feet of unobstructed wave path or infrared for distances of up to six feet with line-of-sight being available between sender and receiver. The UI will enable all associated functions of touch, direction, pressure, multi-tap, multi-finger movements and various predefined or default gestures used to create the defined functionality on the computing device.

Figure 4:
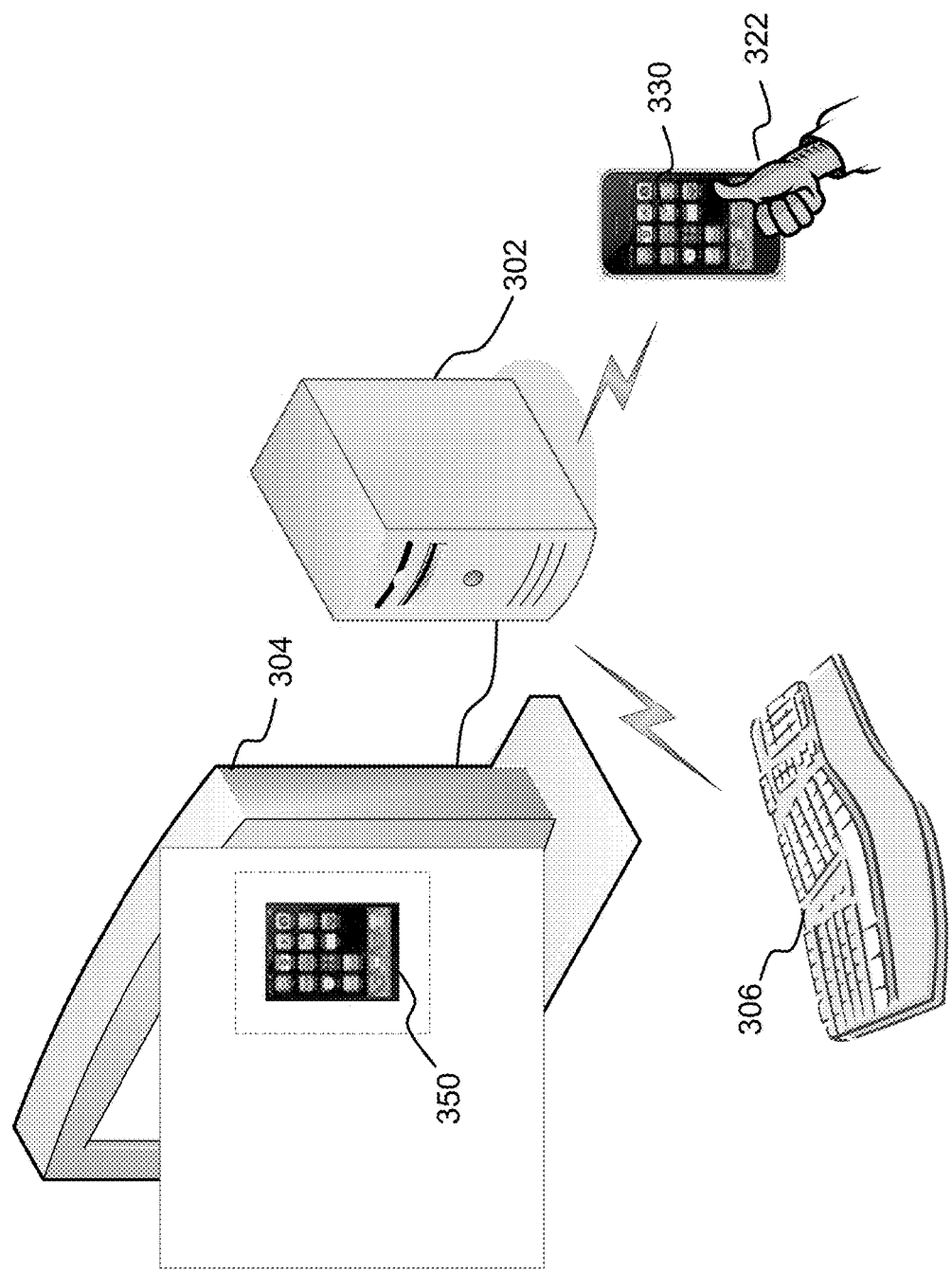
FIG. 4 illustrates an example touch screen system incorporating a touch screen mobile station and a computing device, according to example embodiments of the present invention.

Another set of functionality exists for devices that are WIFI and Bluetooth enabled, which allows the pressure sensitive touch screen device 330 to act as a parent device for the applications defined for use on the device itself and applications of choice will be defined for migration to the host computing device 302 with display 304 as illustrated in FIG. 4. A secondary portion of the association link between the smart phone touch screen device 330 and the host computing device 302 may be established through a Bluetooth handshake procedure. The pressure sensitive touch screen device will confirm that the link to the host computing device 302 as a UI is desired by the user when the user enters the communication range of distance between the mobile station 330 and the host computing device 302. The user will confirm that the predefined programs in the look-up table will be properly configured and setup for operation through the host computing device 302 by using WIFI and high speed Bluetooth depending on the application function and data requirements, as described in detail below. The migration program will query the user when the pressure sensitive touch screen mobile station 330 enters the proximity of the WIFI and/or Bluetooth communication signal.

Figure 6:
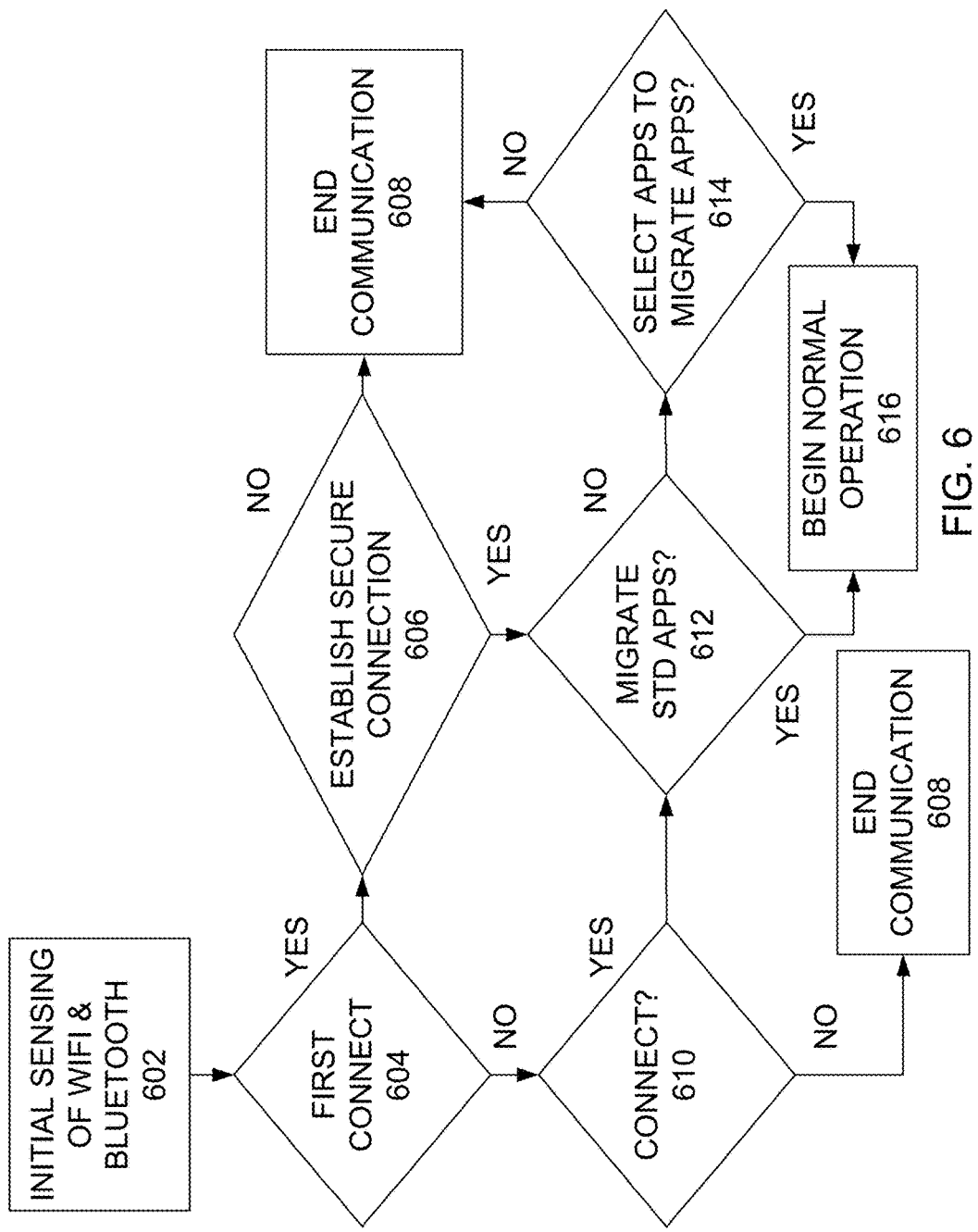
FIG. 6 illustrates another example logic diagram of an example method of operation, according to example embodiments of the present invention.

An example logic diagram of the connection procedure between the mobile station 330 and the host computing device 302 is illustrated in FIG. 6. In operation, the pressure sensitive touch screen mobile station link software installed on the mobile station 330 and/or the host computing device 304 will transmit a query to determine whether to connect as the defined UI for the device via Bluetooth and/or whether to migrate the earlier specified applications to perform computing functions through the host computing device 302 via Bluetooth or WIFI communication signaling. The determination as to what protocol to use may depend on the particular application defined in the handshake connection file.

Referring to FIG. 6, an initial sensing of the WIFI and Bluetooth communication protocol is performed at operation 602. A first connect attempt may be sent from the mobile station 330 or the host device 302 at operation 604. If the connection is established, a determination is performed to check if the connection is secure at operation 606. If not, the communication is ended at operation 608, if so an additional determination is made to check whether the standard (STD) applications have migrated at operation 612.

Standard (STD) applications may be basic communication applications, file functions, and any other applications that the user has defined through a prior setup configuration as those applications the user desires to be migrated for each session. Migrating the control for the STD applications and their corresponding functions will move the functionality from the input of a user input device (keyboard or mouse) operating local to the computer to being controlled, accessed and/or executed remotely through the touch screen of the mobile device.

According to one example, if the user is accessing data files such as pictures, videos, songs, or file documents, those documents may be transferred and run on the mobile device or on the PC, while the output can be directed to the mobile device. This configuration can be selected or run based on a default optimization configuration, which is based on a data rate that the mobile device established during a previous connection. Other functions operating on the host computing device, such as home control functions, and administrative monitoring are set to normally execute at the host computing device and not to be migrated to the mobile device. However, those other functions may still be executed from the mobile station.

Referring again to FIG. 6, the applications must be selected for migration at operation 614, and if so, the normal operation of host computing and integrated mobile station operations may begin at operation 616. If at operation 604, no first connection is established, a determination is made as to whether a pre-existing connection is established or a new connection is necessary at operation 610, if a connection is established the communication procedure ends at operation 608.

Once a communication channel is established, the mobile station may be operated according to a UI 350 displayed the display 304 of the host computing device 302. Functionality would launch or communicate all the local applications such as texting, social networking, specified mapping, music, video, entertainment or any other desired application through the host computing device 302 utilizing the larger screen format of display 304, speakers, microphone, wired or wireless Internet, or any other peripherals available to the host computing device 302 will be accessible via the larger display 304.

An additional set of functions may be performed by devices that are WIFI, Bluetooth and/or cellular phone enabled. According to one example, the pressure sensitive touch screen interface of the mobile station 320/330 can act as a host of the applications defined for use on the device itself, and applications of choice will be defined and migrated to the host computing device 302 with display 304. As a secondary portion of the association link established through the Bluetooth handshake, the pressure sensitive touch screen device will first confirm that the link to the computing device as a UI is desired at a particular time, while in proximity range. Next, a confirmation may be communicated that the defined programs in the look-up table will be setup for operation through the computing device using WIFI and high speed Bluetooth depending on the application function and data requirements as described below.

The migration application will query the user when the pressure sensitive touch screen mobile device 320/330 comes into proximity of the WIFI and Bluetooth signal. The pressure sensitive touch screen mobile device link software will query as to whether to connect as the UI for the device via Bluetooth and or migrate the earlier specified applications including cellular phone functionality to function through the host computing device 304 via Bluetooth or WIFI, depending on the particular application as defined in the handshake connection file. Functionality would launch or communicate all the local applications such as texting, social networking, specified mapping, music, video, entertainment or any other desired application through the host computing device 302 utilizing the larger screen format of display 304 and the additional peripheral devices, such as speakers, microphone, wired or wireless Internet, cellular phone operation, or any other peripherals available to the host computing device 302.

Figure 10:
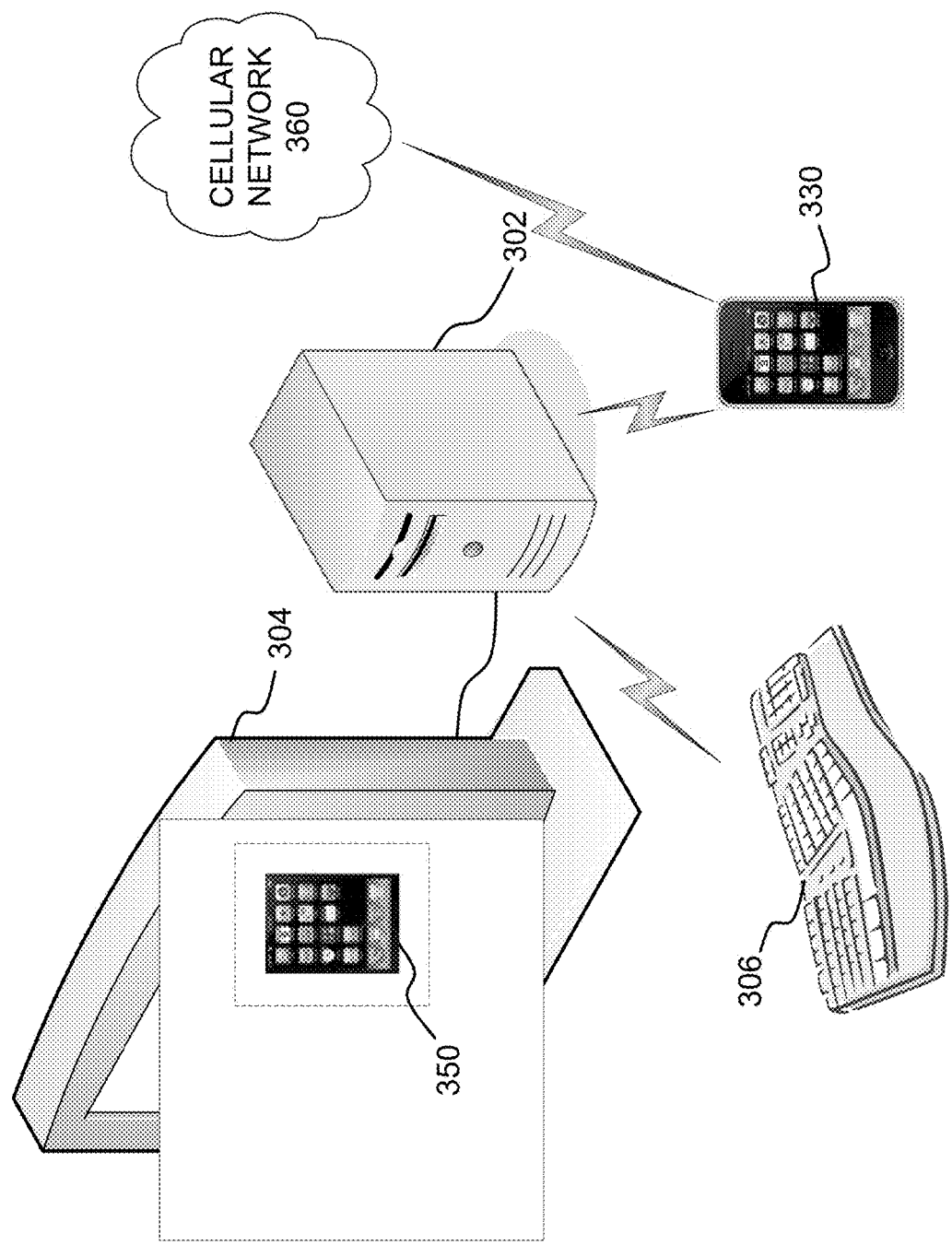
FIG. 10 illustrates an alternative system with a mobile station communicating with a cellular network and a local computing device, according to example embodiments of the present invention.

In operation, the pressure sensitive touch screen device 320/330 acts as a host for the applications defined for use on the device itself. These applications will run in the mobile device environment and the output image, sound and/or corresponding data will be displayed, heard or viewed on the host computing device 302. Applications of choice will be defined for migration to the host computing device 304. The operations performed by the program or application itself will run in the host computing device environment via an OS emulation program matching the OS of the mobile environment. Examples of this application correlation between host computing device 302 and the touch screen mobile station 320/330 are illustrated in FIGS. 3, 4 and 10.

In the case of non-streaming applications, such as a local game or entertainment application, the pressure sensitive touch screen mobile station 320/330 will then be used as the host source for the environment of the application. While the application is running on the mobile station 320/330, the image produced by the applications will appear on the display 304 of the host computing device 302 with the display content being transferred through the application output. The pressure sensitive touch screen of the mobile station 320/330 may be used for input to the host computing device 302 and the display execution of the application will activate the pressure sensitive touch screen mobile station 320/330 to call-up the video application from local memory and direct the display of the application to the host computing device 302 for viewing by the user. The actual execution of the application will be executed on the pressure sensitive touch screen mobile station 320/330.

In the case of a streaming application such as music, video or other real-time high data rate applications, such as the real-time viewing of a movie trailer, the Bluetooth linking will perform a data rate check of the mobile station 320/330 and the host computing device 302 to determine a connection with the greatest data rate and stability. If the computing device 302 has the higher data rate and stability, then the computing device 302 will be used as the host Internet source for the environment of the streaming application. While the application is operating on the mobile station 320/330, the image of the application may appear on the display 304 of the host computing device 302. While using the pressure sensitive touch screen of the mobile station 320/330 for receiving input to the host computing device 302, execution of the application will activate the pressure sensitive touch screen device to call the video from the Internet through the computing device 302. The actual execution of the viewable content of the mobile station 320/330 will be executed on the computing device 302, as illustrated at display section 350 of FIGS. 4 and 10.

Figure 7:
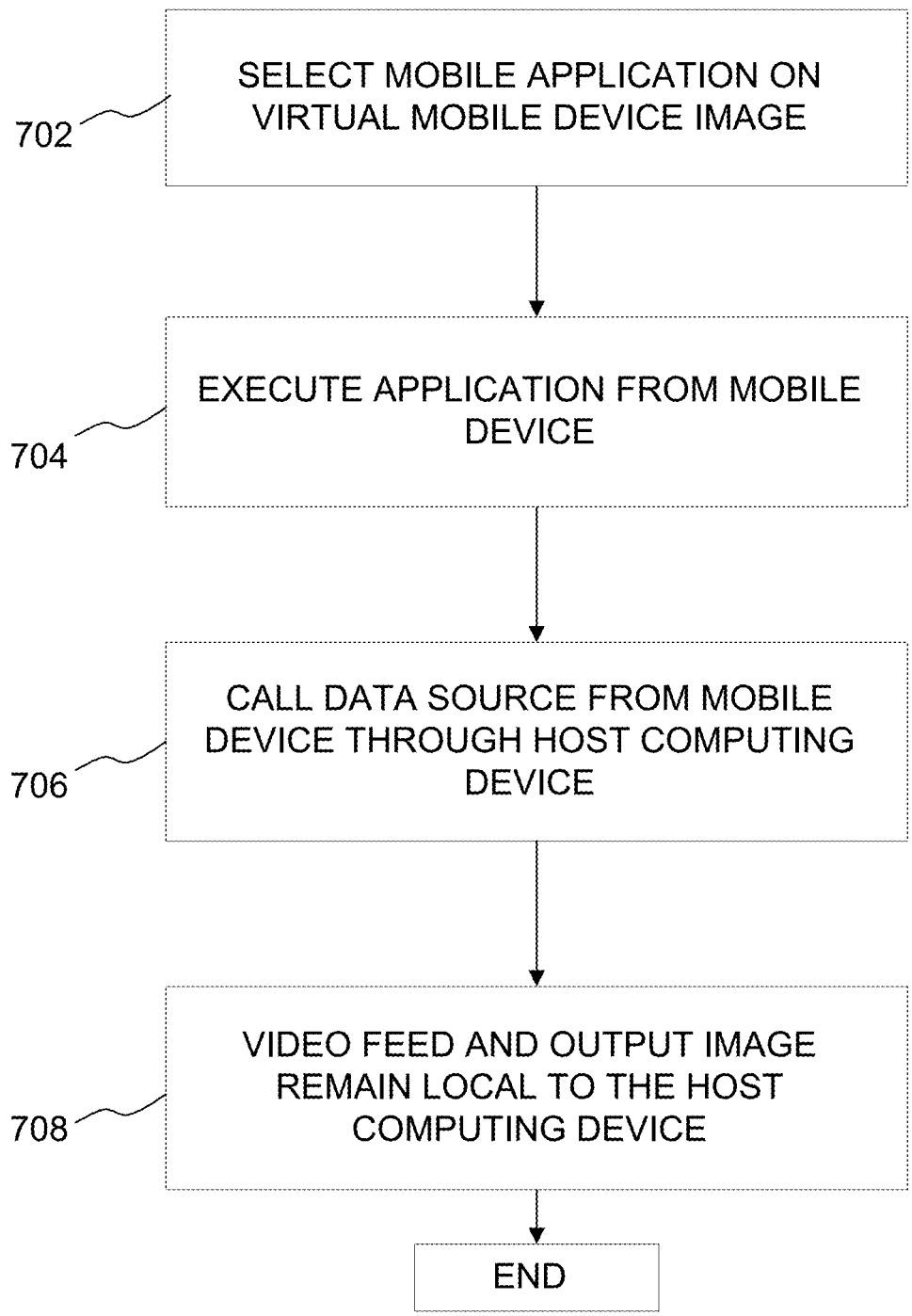
FIGS. 7-9 illustrate example flow diagrams of example methods of operation, according to example embodiments of the present invention.

FIG. 7 illustrates a flow diagram of an example method of operation, according to an example embodiment of the present invention. Referring to FIG. 7, in this example the wireless connection between the mobile device 320/330 and the host computing device 302 provides a lower data rate connection such as Bluetooth, non-3G cellular, etc. In this example, there may be insufficient bandwidth to accommodate high density data traffic. Therefore the mobile device 320/330 is able to call up or execute an application on the host computing device 302 and use the host's higher bandwidth connection (e.g., Ethernet, wireless high speed network interface card, etc.) to stream the data for the application. However, the output/display/interface will remain local to the host computing device 302 for the user's convenience. Or, a lower resolution version may be processed and received on the display of the mobile device 320/330.

According to one example, if the pressure sensitive touch screen of the mobile station 320/330 provides a higher data rate and has a higher stability record than other devices, such as the host computing device 302, then it will be selected as the host Internet source for the environment of the streaming application. While the application is operating on the mobile station 320/330, the image of the application may also appear on the display 304 of the host computing device 302 as a separate UI of a virtual mobile device image 350. A particular mobile application operating on the virtual mobile device/station image 350 may be selected by the user at operation 702. The application may than be executed via the processor of the mobile station 320/330 at operation 704. While using the mobile station 320/330 for input to the host computing device 302, execution of the application will activate the pressure sensitive touch screen of the mobile station 320/330 to call-up the video from a data source, such as the Internet at operation 706 and direct the display of the video to the host computing device 302 for viewing by the user. The actual execution of the data transfer will be executed on the mobile station 320/330. However, the mobile station 320/330 and the host computing device 302 both operate to provide an interactive and integrated application environment for the user. The actual video feed in this example and the output image may remain viewable on the display 304 of the local host computing device 302 at operation 708.

Figure 8:
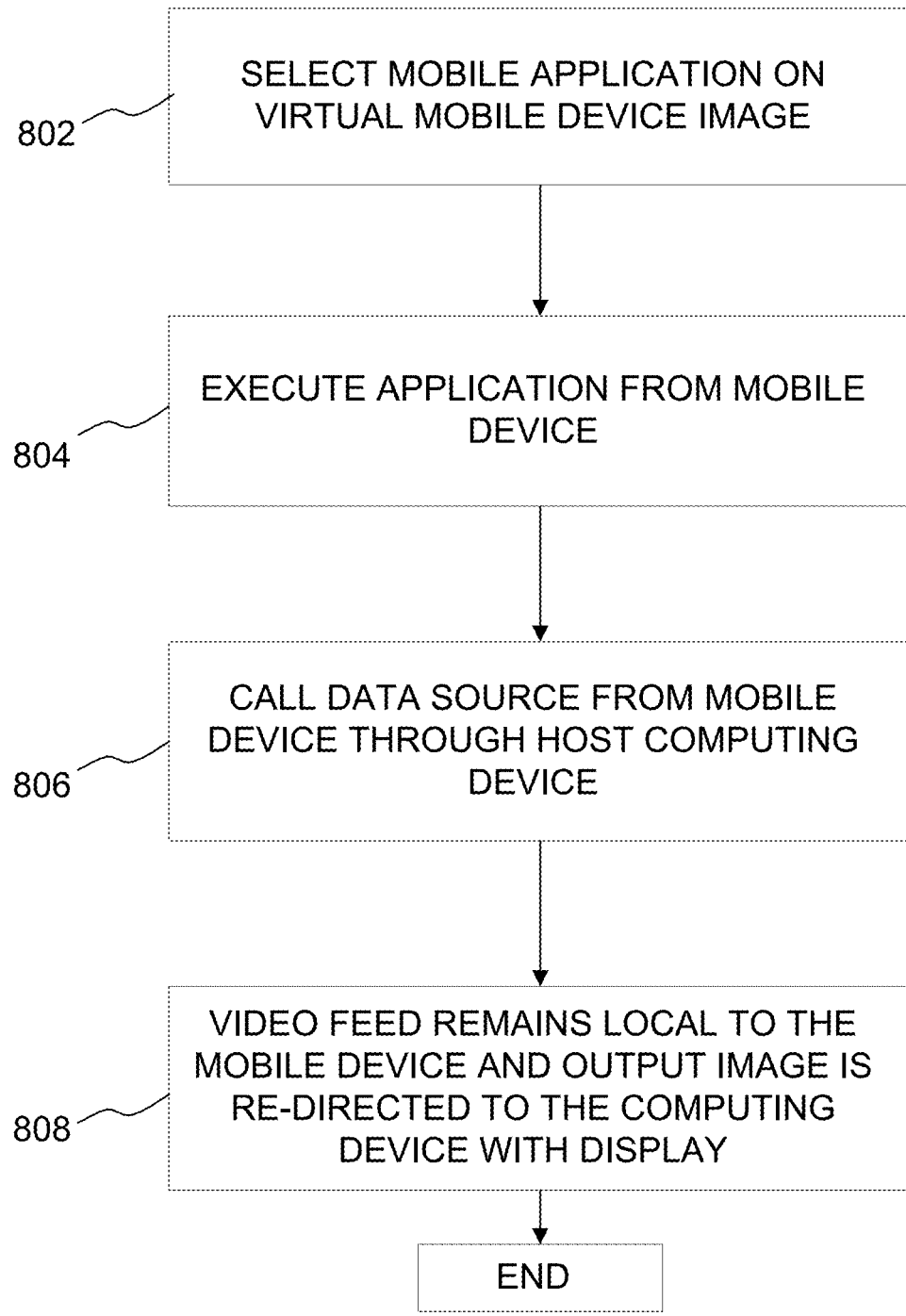

FIG. 8 illustrates a flow diagram of another example method of operation, according to an example embodiment of the present invention. Referring to FIG. 8, in this example the data rate available to the mobile device 320/330 may be a relatively high bandwidth data rate compared to the other neighboring computing devices, and the stable network data source, may be a local WIFI type connection or a 3G/4G LTE or similar connection. In this situation, the actual application that is executed on the mobile device 320/330, and the host computing device 302 or the Internet is used as the data source. Data may be streamed from one device to other in a data streaming manner. The output of the audio, video or other high density data is delivered to either or both of the mobile device 320/330 and/or the host computer device 302 and its respective peripheral devices, speakers, screen, etc.

While the application is operating on the mobile station 320/330, the image of the application may also appear on the display 304 of the host computing device 302 as a separate UI of a virtual mobile device image 350. A particular mobile application operating on the virtual mobile device/station image 350 may be selected by the user at operation 802. The application may than be executed via the processor of the mobile station 320/330 at operation 804. While using the mobile station 320/330 for input to the host computing device 302, execution of the application will activate the pressure sensitive touch screen of the mobile station 320/330 to call-up the video from a data source, such as the Internet at operation 806 and direct the display of the video to the host computing device 302 for viewing by the user. The actual execution of the data transfer will be executed on the mobile station 320/330. However, the mobile station 320/330 and the host computing device 302 both operate to provide an interactive and integrated application environment for the user. The actual video feed in this example and the output image may remain local to the mobile station 320/330, while the output image is re-directed to the display 304 of the host computing device 302.

Figure 9:
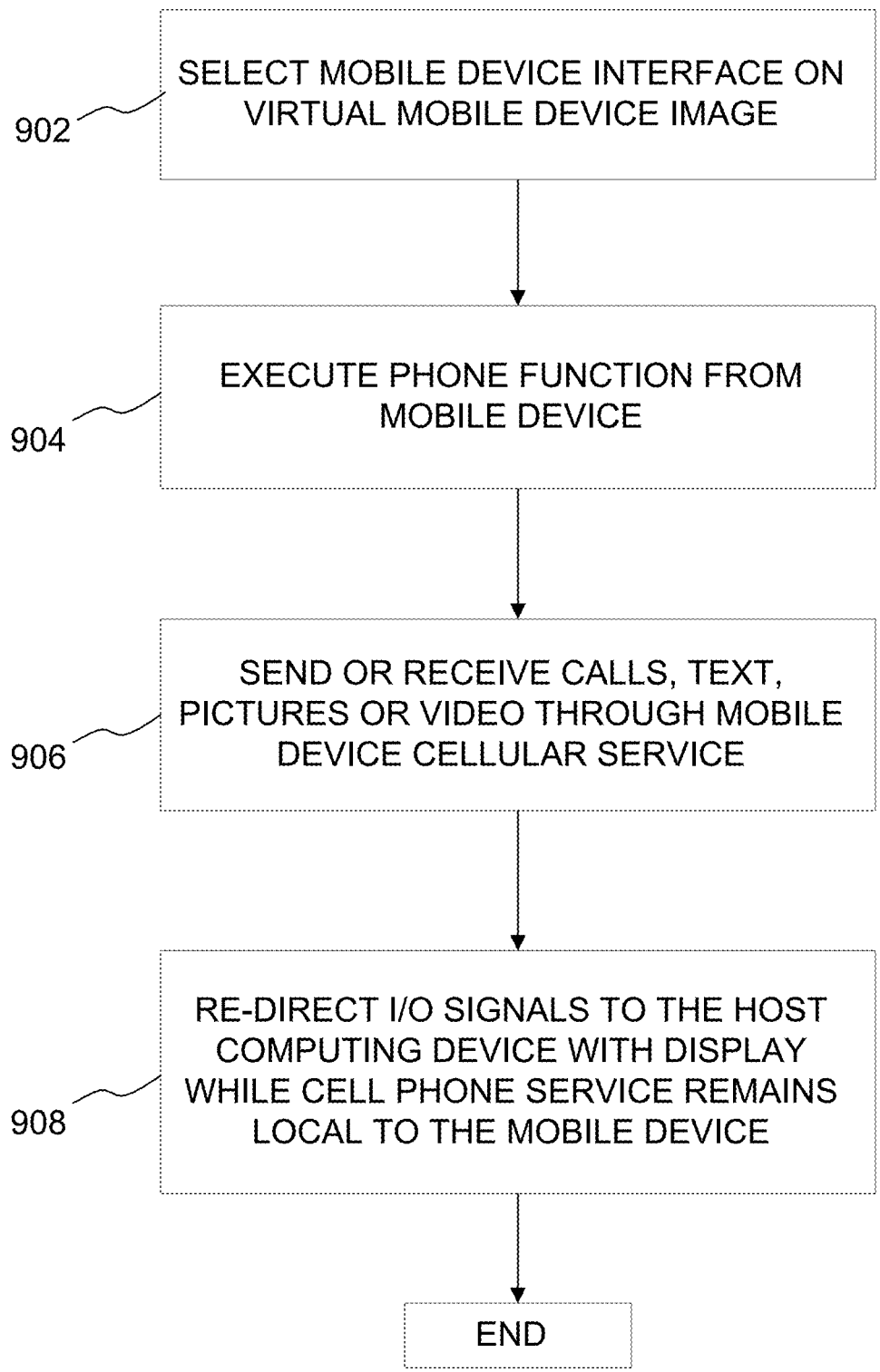

FIG. 9 illustrates a flow diagram of another example method of operation, according to an example embodiment of the present invention. Referring to FIG. 9, the cellular or IP-based phone capacity of the mobile device 320/330 may be used while the host PC is used as a remote port. Calls, text messages, pictures, video conferencing or any unified communication format or medium may be executed through the mobile device 320/330, but the input and output is directed to the host monitor 304 and other peripheries, such as speakers, camera, etc., as well as the mobile device's display and speakers if each is locally selectable. In this configuration, a call can be originated at the user's desk through the host computer 302 and the user can pick up the mobile device 320/330 and leave the site while connected to the original call. Conversely, if one of the various user devices is operating on a cellular or IP-based data communication with a remote location, then the two devices (mobile device 320/330 and the host computing device 302) may both establish a communication session and permit the user to switch I/O devices from the mobile device 320/330 to the host computing device 302 depending on the user's convenience preference.

While the application is operating on the mobile station 320/330, the image of the application may also appear on the display 304 of the host computing device 302 as a separate UI of a virtual mobile device image 350. An interface of the mobile station operating on the mobile device/station image 350 may be selected by the user at operation 902. A phone application may than be executed via the processor of the mobile station 320/330 at operation 904. While using the mobile station 320/330 for input to the host computing device 302, execution of the application will activate the pressure sensitive touch screen of the mobile station 320/330 to send or receive telephone calls, text messages, pictures, or video through the mobile station's cellular service (see FIG. 10), at operation 906. The mobile station 320/330 and the host computing device 302 both operate to provide an interactive and integrated application environment for the user even for cellular phone calls initiated by the mobile station 320/330. The I/O signals may be redirected to the host computing device 302, while the peripherals and cell phone service may remain local to the mobile device at operation 908. This allows the mobile station to be operated as intended, while the benefit of the UI is received and processed on the host computing device 302 for convenience.

FIG. 10 illustrates an alternative system with a mobile station communicating with a cellular network and a local computing device, according to example embodiments of the present invention. In this example, the pressure sensitive touch screen mobile station 320/330 has an embedded cellular phone capability and is configured in a linked UI mode with the phone function migrated to the display 304 of the host computing device 302. All peripherals of the host computing device 304 will function as the speaker, microphone and display screen for the phone feature of the mobile station 320/330 during the call session. While the phone function is operating on the mobile station 320/330 the image of the applications appear on the display 302 of the host computing device 304.

Using the pressure sensitive touch screen of the mobile station 320/330 to input commands to the host computing device 302, the phone application will activate the mobile station 320/330 to perform a look-up operation, execute outgoing calls, receive incoming calls via a cellular network 1000 and direct the display content, sound and speech corresponding to the call to a host computing device 302. The actual execution of the call function will be executed on the mobile station 320/330.

By integrating user input pressure and a directional vector on the mobile station 320/330, the user can modify more functions in less space and achieve more natural and more responsive control over their devices. In addition, the porting functionality enables a single user definition of look and feel between anyone's computing environments along with enhanced interface to their portable computing world while in proximity of a computing device with greater capabilities. Function change can be executed more rapidly and within less physical space than methods not employing the integration of a directional vector and pressure algorithm.

Nominally fewer mechanical parts with motion for failure. Providing greater reliability and less susceptible to contamination from any foreign material. Commonality of fit form and function across ones entire computing environments. The migration of applications to the wired higher data rate capability of a computing device with display ensures consistent and higher speed utilization then cellular signals indoors or wireless WIFI. It is also easier to view and listen to applications via the computing device with display.

User interfaces on small electronic devices, such as smart phones, are limited in size and viewing capabilities. A user interface that is integrated with a host computing device enables greater functionality and use of mobile stations in migration of their applications to more capable computing devices with access to higher data rate Internet sources.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 11 illustrates an example network element 1100, which may represent any of the above-described network components 240, 302, 320, 330, etc.

Figure 11:
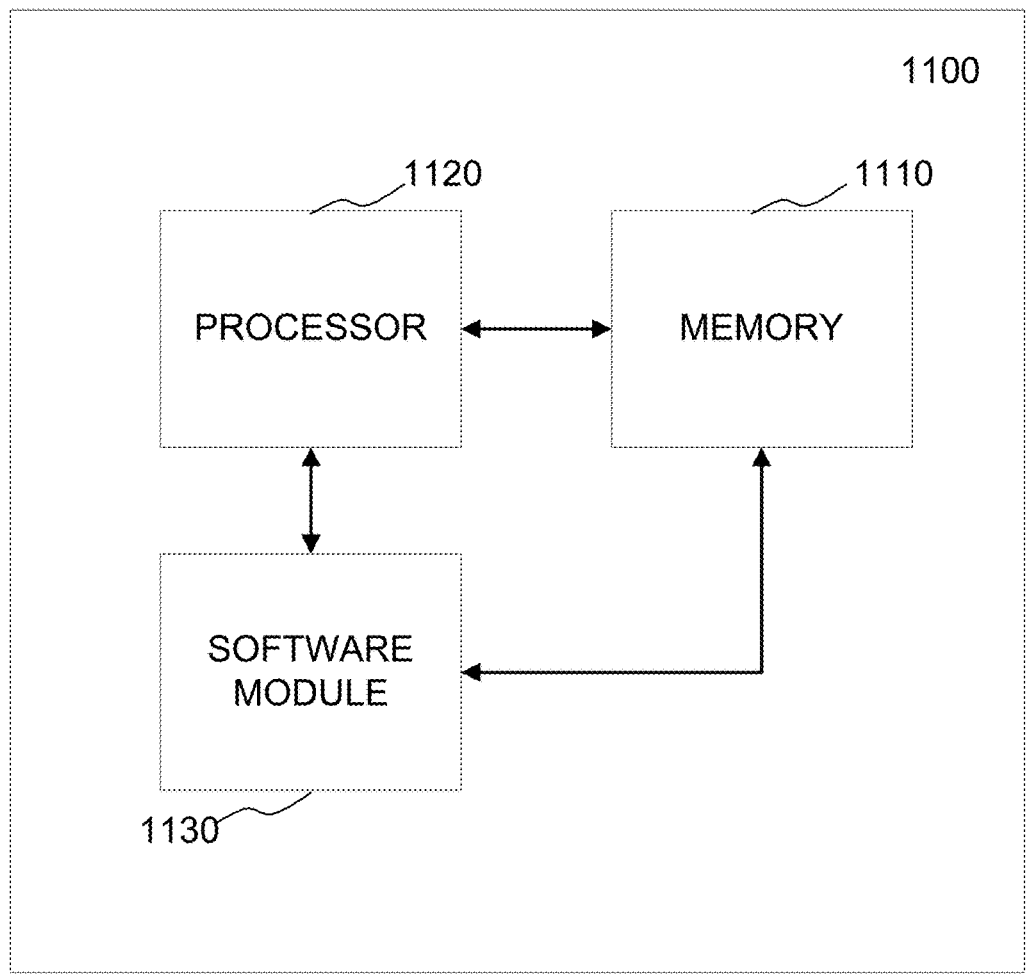
FIG. 11 illustrates an example network entity device configured to store instructions, software, and corresponding hardware for executing the same, according to example embodiments of the present invention.

As illustrated in FIG. 11, a memory 1110 and a processor 1120 may be discrete components of the network entity 1100 that are used to execute an application or set of operations. The application may be coded in software in a computer language understood by the processor 1120, and stored in a computer readable medium, such as, the memory 1110. The computer readable medium may be a non-transitory computer readable medium that includes tangible hardware components in addition to software stored in memory. Furthermore, a software module 1130 may be another discrete entity that is part of the network entity 1100, and which contains software instructions that may be executed by the processor 1120. In addition to the above noted components of the network entity 1100, the network entity 1100 may also have a transmitter and receiver pair configured to receive and transmit communication signals (not shown).

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method of communicating between a mobile device and a host computing device, the method comprising:
   sensing a wireless communication signal at the host computing device;
   establishing a wireless connection between the mobile device and the host computing device via the wireless communication signal;
   migrating control for at least one application and corresponding functions of the at least one application from the host computing device to the mobile device, wherein the migrating of the control comprises moving functionality of the at least one application and the corresponding functions from an input of the host computing device to being controlled through a touch screen of the mobile device; and
   transferring and running a data file on the mobile device or the host computing device based on a default optimization configuration when the user accesses the data file, the default optimization configuration based on a data rate that the mobile device established during a previous connection.

2. The method of claim 1, wherein the wireless connection comprises a secure connection.

3. The method of claim 1, wherein the mobile device comprises at least one of a cellular phone, a smart phone and a handheld computing device.

4. The method of claim 1, wherein the at least one application comprises a plurality of standard applications designated by a user to be migrated prior to migrating the at least one application from the mobile device to the host computing device.

5. The method of claim 1, further comprising:
   executing at least one command on the mobile device; and
   displaying at least one response to the at least command on the host computing device.

6. The method of claim 1, further comprising:
   sending or receiving a call from the mobile device;
   redirecting call data from the call to the host computing device; and
   providing a user interface for a user to conduct the call via the host computing device.

7. The method of claim 1, further comprising:
   sending or receiving at least one of text, video and images via the mobile device; and
   redirecting the at least one of the text, video and images to a display of the host computing device.

8. A mobile apparatus configured to communicate with a host computing device, the mobile apparatus comprising:
   a sensor configured to sense a wireless communication signal from the host computing device;
   a transmitter configured to establish a wireless connection with the host computing device in response to the wireless communication signal;
   a touch screen configured to receive input from a user; and
   a processor configured to migrate control for at least one application and corresponding functions of the at least one application from the host computing device to the mobile apparatus, wherein the migrating of the control comprises moving functionality of the at least one application and the corresponding functions from an input of the host computing device to being controlled through the touch screen of the mobile apparatus, wherein
   the processor is configured to transfer and run a data file on the mobile apparatus or the host computing device based on a default optimization configuration when the user accesses the data file, the default optimization configuration based on a data rate that the mobile apparatus established during a previous connection.

9. The mobile apparatus of claim 8, wherein the wireless connection comprises a secure connection.

10. The mobile apparatus of claim 8, wherein the mobile apparatus comprises at least one of a cellular phone, a smart phone and a handheld computing device.

11. The mobile apparatus of claim 8, wherein the at least one application comprises a plurality of standard applications designated by a user to be migrated prior to migrating the at least one application to the host computing device.

12. The mobile apparatus of claim 8, wherein the processor is further configured to execute at least one command and transmit a response to the command to a display of the host computing device.

13. The mobile apparatus of claim 8, wherein the transmitter is further configured to send or receive a call, and the processor is further configured to redirect call data from the call to the host computing device.

14. The mobile apparatus of claim 8, wherein the transmitter is further configured to send or receive at least one of text, video and images via the mobile device, and the processor is further configured to redirect the at least one of the text, video and images to a display of the host computing device.

15. A non-transitory computer readable storage medium configured to store instructions that, when executed, cause a processor to facilitate communication between a mobile device and a host computing device, the processor further configured to:
   sense a wireless communication signal at the host computing device;
   establish a wireless connection between the mobile device and the host computing device via the wireless communication signal;
   migrate control for at least one application and corresponding functions of the at least one application from the host computing device to the mobile device, wherein the migrating of the control comprises moving functionality of the at least one application and the corresponding functions from an input of the host computing device to being controlled through a touch screen of the mobile device;
   use the mobile device as a host source for an environment of an application when the application is a non-streaming application; and
   use whichever of the mobile device and the host computing device has a connection with a greatest data rate and stability higher data rate as a host Internet source for the environment of the application when the application is a streaming application, wherein a default optimization configuration of the mobile device is based on a data rate that the mobile apparatus established during a previous connection.

16. The non-transitory computer readable storage medium of claim 15, wherein the wireless connection comprises a secure connection.

17. The non-transitory computer readable storage medium of claim 15, wherein the mobile device comprises at least one of a cellular phone, a smart phone and a handheld computing device.

18. The non-transitory computer readable storage medium of claim 15, wherein the at least one application comprises a plurality of standard applications designated by a user to be migrated prior to migrating the at least one application from the mobile device to the host computing device.

19. The non-transitory computer readable storage medium of claim 15, the processor further configured to:
   execute at least one command on the mobile device; and
   display at least one response to the at least command on the host computing device.

20. The non-transitory computer readable storage medium of claim 15, the processor further configured to:
   send or receive a call from the mobile device;
   redirect call data from the call to the host computing device; and
   provide a user interface for a user to conduct the call via the host computing device.

* * * * *